Patented Feb. 6, 1940

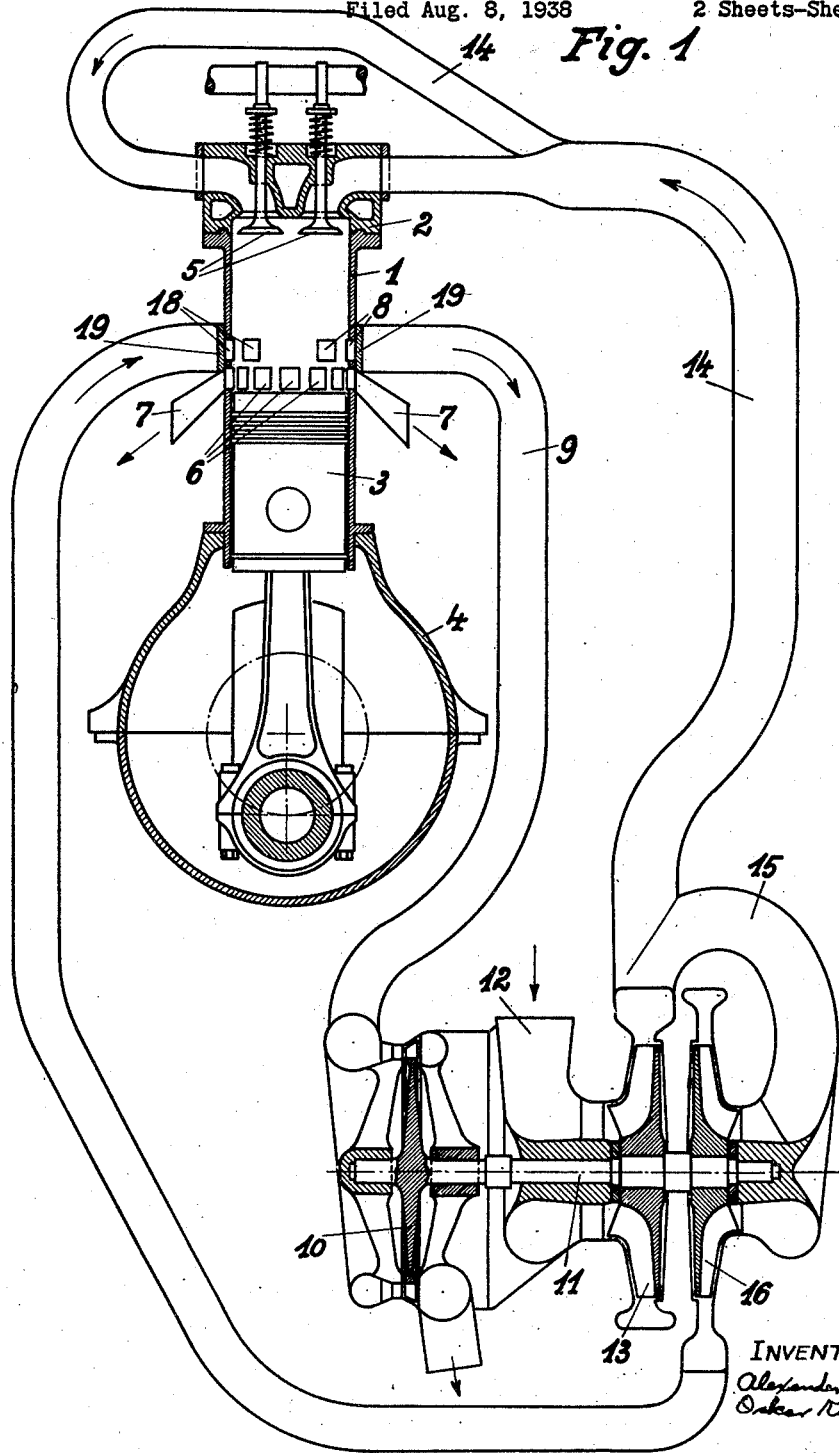

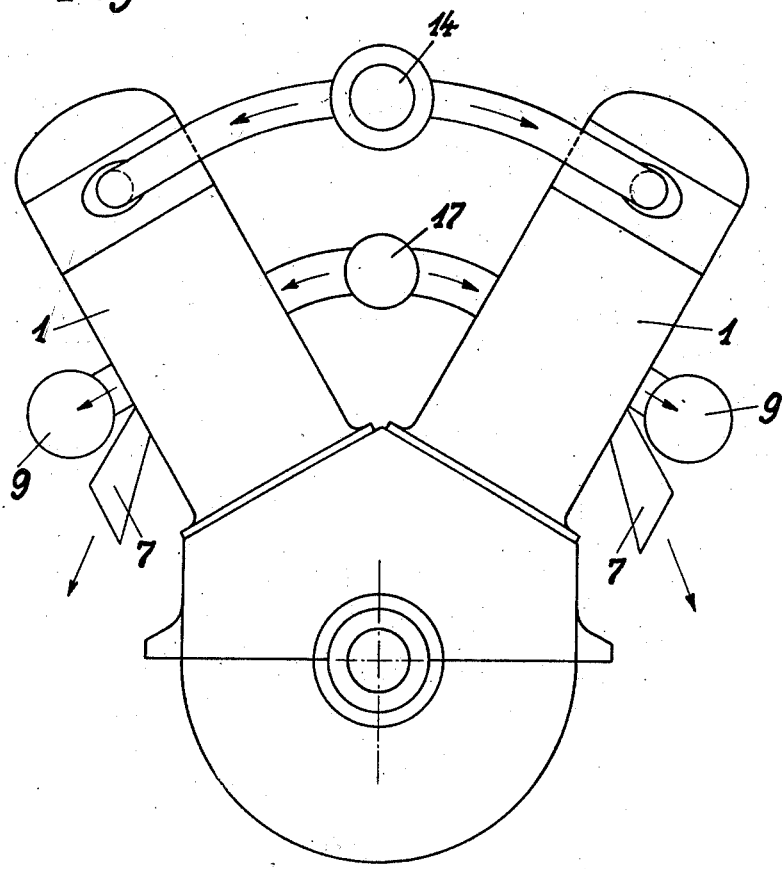

2,189,106

UNITED STATES PATENT OFFICE 2,189,106

INTERNAL COMBUSTION ENGINE

Alexander Garve and Oskar Kurtz, Augsburg, Germany, assignors to Maschinenfabrik Augsburg-Nürnberg A. G., Augsburg, Germany, a corporation of Germany Application August 8, 1938, Serial No. 223,672
In Germany August 10, 1937

4 Claims. (Cl. 60—13)

The invention relates to a two-cycle internal combustion engine which, especially as an airplane motor, is intended to operate at high altitudes. For charging the working-cylinders of two-cycle airplane motors, even at higher altitudes generally the scavenging air is used which for this purpose has to be highly compressed. In order to arrive at the lowest feasible weight per unit of efficiency which means a relatively low engine weight, it would be necessary, as in the case of motors for ground-bound vehicles to further increase the supply of combustion air and supercharge them therewith. At higher altitudes this would however means too high an expenditure of power as the energy of the waste gases normally utilized for these purposes would not suffice to compress the combustion air. To take the turning moment for driving the blower, even only in part, from the crankshaft of the motor would mean considerable loss of propeller efficiency.

According to the present invention this difficulty is surmounted in the following manner. Burnt gases of higher pressure are withdrawn from the working-cylinder of the internal combustion engine before opening the outlet ports leading normally into the open, and utilized for operating an axhaust gas turbine driving a two- or more-stage turbine-blower the first stage of which is tapped for the withdrawal of low-compressed scavenging air while the higher compressed air after leaving the remaining stages is used for supercharging the combustion engine. Withdrawing the burnt gases from the working-cylinder thus early, their higher energy will raise the efficiency of the turbine to a degree that enables it to supply sufficiently higher-compressed supercharging air, on condition however that the compressed air produced by the blower will be subdivided into low-compressed scavenging air and supercharging air of higher pressure. Since the relatively large quantities of scavenging air need not be compressed to the same degree as the air for supercharging the cylinders, there results a considerable gain of efficiency of the turbine which in turn benefits the increased compression of the supercharging air. Only in this manner, that is by the co-actions of, on the one hand, operation of the exhaust turbine with burnt gases which in the working-cylinder are not yet fully utilized and, on the other, division of the compressed air produced in the blower into lower-compressed scavenging air and higher-compressed supercharging air, is it possible to arrive at an efficient two-cycle internal combustion airplane engine for high altitudes.

A preferred form of the two-cycle internal combustion engine according to the invention is by way of example shown in the drawings.

Fig. 1 is a sectional elevation of the internal combustion engine and the turbine-blower;

Fig. 2 a schematic front elevation of a V-shaped motor, showing the position of the air and gas pipings.

In the Fig. 1 is 1 the working-cylinder, 2 the cylinder-head, 3 the piston and 4 the crankshaft casing of the combustion engine. The scavenging of the working-cylinder is effected from the top by valves 5. The exhaust gases escape below through the piston-controlled exhaust ports 6 and the connecting exhaust piping into the open. On the one side of the cylinder, above the exhaust ports 6, a number of ports 8 are provided through which burnt gases are withdrawn from the cylinder 1 before their expansion within the cylinder has been fully utilized. These burnt gases which still possess considerable energy are conducted through the piping 9 to the turbine 10. On the turbine shaft 11 a two-stage blower 13 is provided which through the piping 12 sucks air into the first blower wheel 13. After leaving the first stage, part of the compressed air is, as scavenging air, sent through the piping 14 to the working-cylinder which it enters by the scavenging valve 5. The other part of the air which leaves the first blower stage passes through piping 15 to the blower wheel 16 of the second blower stage. Thence the higher compressed air passes through the piping 17 to the supercharge ports 18 which are situated on the same level in the cylinder wall as the ports 8. In case supercharging requires still higher compression the blower can of course be furnished with additional stages which the supercharging air is made to pass successively. Since the ports 8 and 18 are simultaneously covered and uncovered by the piston but are to function at different times means for separate control must be provided, such as for instance a controlled cylinder slide valve 19 which opens and closes the ports 8 and 18 at the required moment.

The operation of the combustion engine is as follows. After the injected fuel has been ignited near the upper dead center position of the piston it expands during combustion and drives the piston downward. At the moment when the piston 3 uncovers the ports 8, the slide 19 leaves the ports 8 outwardly open so that a portion of the burnt gases may stream through the piping 9 to the turbine 10. In this position of the piston 3 the slide 19 keeps the supercharge ports 18 outwardly shut. The slide 19 shuts the ports 8 as soon as the piston 3 on its downward stroke uncovers the exhaust ports 6 letting the exhaust gases escape into the open. Simultaneously the scavenging valves 5 open and allow the low-compressed scavenging air to pass from the piping 14 into the working-cylinder. The scavenging air drives the residual exhaust gases through the ports 6 into the open. Since an even stream of scavenging air sweeps the whole extent of the cylinder, the exhaust gases will be completely expelled. After reversal at the lower dead center the piston 3 covers first the exhaust ports 6, and the valves 5 are closed. Now the slide 19 opens the supercharge ports 18, so that high-compressed supercharge air may stream through the piping 17 into the working-cylinder. This lasts until the piston 3 on its up-stroke has again covered the ports 18. The rest of the stroke serves to compress the combustion air in the working-cylinder. It is evident that the ports 8 are kept open only as long as the upper edge of the piston passes them on the down-stroke, so that only high-tensioned burnt gases of great value for the operation of the turbine may reach the turbine. The ports 18 on the other hand are open only on the up-stroke of the piston, when all the other cylinder openings are covered or closed. In this manner losses of high-grade supercharge air by escape into the open or into the turbine piping are avoided.

In the Fig. 2 the most advantageous disposition of the requisite gas- and air-pipings for the operation of an airplane motor for high altitudes is shown, for instance on a V-shaped motor, although adapted also for motors of other types where there are a plurality of laterally spaced rows of cylinders. The high-pressure and low-pressure pipings 17 and 14 lie between the cylinders 1; the exhaust pipings 7 and 9 are placed on the outside of the motor. The advantage of this disposition is that the hot exhaust pipings are well swept and thereby effectively cooled by the wind caused by the motor of the airplane, while the naturally cooler scavenging and supercharge pipings lie on the less ventilated insides.

What is claimed is:

1. A two-cycle internal combustion engine having cylinders and pistons operable therein, said cylinders having final exhaust ports adjacent one end of the cylinders and arranged to be covered and uncovered by the pistons, scavenging air inlet openings at the other end of the cylinders, said cylinders having additional openings for the supply of supercharging air to the cylinders and for the early discharge of exhaust gases from the cylinders, said additional openings being arranged to be uncovered by the pistons before the pistons uncover the final exhaust openings, turbine blower means having a discharge conduit for supplying low pressure air to said scavenging air inlet openings and having a second discharge conduit for supplying higher pressure air to said additional openings, an exhaust driven turbine drive for said blower means, means for supplying exhaust gases from said additional openings to said turbine drive, and valve means for automatically controlling the flow through said additional openings to prevent exhaust gas flow therethrough after the final exhaust ports are opened by the pistons and to prevent flow of supercharging air to the cylinders during flow of the early exhaust gases from the cylinders.

2. A two-cycle internal combustion engine having cylinders and pistons operable therein, said cylinders having final exhaust ports adjacent one end of the cylinders and arranged to be covered and uncovered by the pistons, scavenging air inlet openings adjacent the other end of the cylinders, and supercharging air inlet openings adapted to be uncovered by the pistons before they uncover the final exhaust ports, turbine blower means having a discharge conduit for supplying low pressure air to said scavenging air inlet openings and having a second discharge conduit for supplying higher pressure air to said supercharging air inlet openings, an exhaust driven turbine drive for said blower means, said cylinders also having early exhaust ports adapted to be uncovered by the pistons before they uncover the final exhaust ports, means for supplying exhaust gases from said early exhaust ports to said turbine drive, and valve means for automatically controlling said early exhaust ports and said supercharging air inlet openings at predetermined times in the sequence of operations to prevent flow through said early exhaust ports while the final exhaust ports are uncovered and while the supercharging air inlet openings are open, and to open said supercharging air inlet openings after the piston has closed the final exhaust ports.

3. A two-cycle internal combustion engine having cylinders and pistons operable therein, said cylinders having final exhaust ports adjacent one end of the cylinders and arranged to be covered and uncovered by the pistons, scavenging air inlet openings adjacent the other end of the cylinders, and supercharging air inlet openings adapted to be uncovered by the pistons before they uncover the final exhaust ports, a multiple stage blower having a discharge conduit for supplying low pressure air from the first stage to said scavenging air inlet openings and having a second discharge conduit for supplying higher pressure air from a subsequent stage to said supercharging air inlet openings, an exhaust driven turbine drive for said blower means, said cylinders also having early exhaust ports located substantially in the same transverse plane as the supercharging air inlet openings and adapted to be uncovered by the pistons before they uncover the final exhaust ports, means for supplying exhaust gases from said early exhaust ports to said turbine drive, and valve means for automatically controlling said early exhaust ports and said supercharging air inlet openings at predetermined times in the sequence of operations to prevent flow through said early exhaust ports while the final exhaust ports are uncovered and while the supercharging air inlet openings are open, and to open said supercharging air inlet openings after the piston has closed the final exhaust ports.

4. A two-cycle internal combustion engine having a number of working cylinders disposed in a multiplicity of rows laterally spaced apart, pistons operable in said cylinders, said cylinders having exhaust ports adjacent one end of the cylinders and arranged to be covered and uncovered by the pistons, scavenging air inlet openings at the other end of the cylinders, said cylinders also having additional openings for supplying supercharging air to the cylinders and arranged to be covered and uncovered by the pistons, a turbine driven blower for separately supplying relatively low pressure scavenging air and relatively high pressure supercharging air respectively to the scavenging air inlet openings and the additional supercharging air openings, exhaust pipings leading from the said exhaust ports to the turbine and arranged on the outer sides of each of the rows of cylinders, and independent air pipings disposed one outwardly of the other between the rows of cylinders and extending from the blower to the scavenging air inlet openings and the supercharging air inlet openings.

ALEXANDER GARVE.
OSKAR KURTZ.